UNITED STATES PATENT OFFICE.

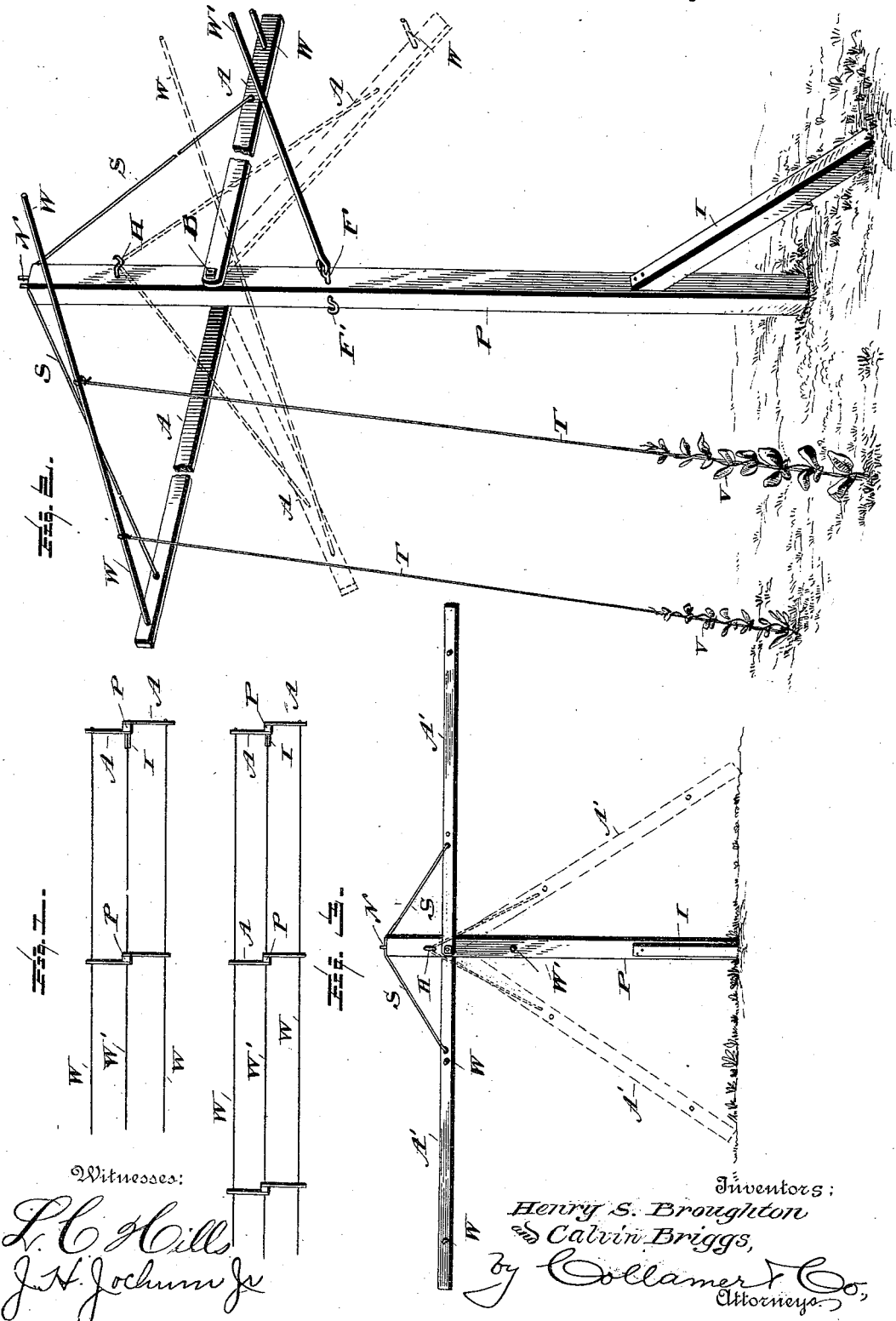

HENRY S. BROUGHTON AND CALVIN BRIGGS, OF CLYMER, OREGON.

HOP-TRELLIS.

SPECIFICATION forming part of Letters Patent No. 542,821, dated July 16, 1895.

Application filed June 16, 1893. Serial No. 477,813. (No model.)

*To all whom it may concern:*

Be it known that we, HENRY S. BROUGHTON and CALVIN BRIGGS, citizens of the United States, residing at Clymer, in the county of Marion and State of Oregon, have invented certain new and useful Improvements in Hop-Trellises; and we do hereby declare the following to be a full, clear, and exact description of the invention, such as will enable others skilled in the art to which it appertains to make and use the same.

This invention relates to trees, plants, and flowers, and more especially to trellises for supporting the vines in the art of hop-culture; and the object of the same is to effect certain improvements in said trellises.

Heretofore for many years it was customary to train the hop-vines on upright poles or stakes, and when it became desirable to strip the hops from the vines the pole or the poles and vines were cut down, so as to bring the hops within reach of the operater for the purpose of picking. Later the idea was conceived of building what was called the "horizontal" hop-frame, which consisted of wires or poles strung between arms supported at suitable distances by upright poles or posts; but the objection arose with the use of this frame that when the hops were picked it was necessary either to cut down the wires or the wires and arms or the entire structure or to provide ladders or similar supports for raising the picker to a suitable height to reach the hops. The present invention avoids this objection by providing means whereby the supporting wires or rods may be let down when it is desired to pick the hops, so that the latter will come within reach of an operator standing on the ground, as will be understood; and to this end the invention consists in uprights, arms pivoted thereto, stays supporting said arms normally in horizontal positions, means for loosening the stays so as to let down the arms to oblique or vertical positions, and supporting wires or rods connecting the arms in pairs across a field, all as hereinafter more fully described, and as shown in the drawings, wherein—

Figure 1 is a plan view showing in diagram a small field as provided with two hop-trellises of this improved construction. Fig. 2 is an enlarged perspective view of one of the end uprights. Fig. 3 is a reduced elevation showing a slight modification.

Referring to the said drawings, the letter P designates an upright, which is by preference a four-inch square post driven into the ground and rising about twelve feet above the surface, although it could be a round post, a pole, a tube, and of metal or any suitable material. These uprights are seated in alignment with each other about forty-two feet apart and in rows across the field, and the end uprights of each row are suitably braced or anchored, as by the inclined beams I.

A A are two arms, preferably of wood, measuring four inches by one inch and about seven feet long, and the inner ends of these arms are pivotally mounted at opposite sides of the upright on a bolt B extending through the same about eight feet above the ground.

S is a stay or supporting wire connected at its ends to the arms A at points preferably between their extremities, and extending at its center through a groove or between nails N, driven into the upper end of the upright or in one of its side faces near said upright. The length of this stay is such that when it passes through the notch it will hold the arms about horizontal, as seen in full lines in Fig. 2.

The letter H designates a hook or other suitable support seated in one face of the upright about midway between the bolt B and the upper end thereof, as shown.

The letters W W in the present instance designate wires, although they could be stout cords, rods, or strips of any suitable material, and these wires are connected with the outer extremities of the arms A of the endmost uprights and extend through the extremities of the arms of all the intermediate uprights, thus passing entirely across the field.

In Fig. 3 is shown an upright having somewhat longer arms A', each of which carries two of the wires W, and it will be obvious that one or more wires could be carried by each arm.

W' designates an additional wire secured by any fastening means, as the eye F, to each endmost upright at a point somewhat below the bolt B and extending through the intermediate uprights, as will be understood, and F' designates a fastening device seated in the side of the upright and which could be an eye or a hook, as shown, these fastening devices being used on the intermediate uprights, or the endmost ones, or both.

In the use of this improved trellis the vines V are planted in rows at such points that they will grow beneath the three wires W, and they are trained up to the wires on twines T. In time they will grow to a height of eight feet, and if higher their tops are led out laterally along the wires. When the hops have ripened, or reached the proper stage for picking, a pole is passed up the upright under the stay S and the latter is lifted out of the notch and let down onto the hook H, which operation lowers the arms A to the positions shown in dotted lines in Fig. 2. With the arms the wires W are lowered and the hops can readily be picked by an operator standing on the ground. As the intermediate wire W' is not so high it is not necessary to lower it for the purpose of picking the hops. After picking, the arms can be again raised by lifting the stay off the hook and again passing it over the upper end of the upright.

We do not limit ourselves to the exact sizes, shapes, proportions, or materials of parts, nor to the precise construction herein shown and described, as considerable change may be made therein without departing from the spirit of our invention. It is also obvious that this improved trellis may be used for other purposes than hop-culture; but we have described it in that connection because we find it especially desirable that the hop-vines be let down for picking rather than torn down, either with or without their supporting-trellises.

What we claim as new is—

1. A support of the character described, consisting of an upright, arms pivotally connected with and extending from opposite sides of said upright at a point near its upper end, an open notch at the upper extremity of the upright, and a stay-wire connected at its ends with said arms and leading intermediate its ends removably through said notch, and of a length to then hold the arms horizontal, as and for the purpose set forth.

2. A support of the character described, consisting of an upright, arms pivotally connected with and extending from opposite sides of said upright at a point near its upper end, a notch at the upper extremity of the upright, a stay-wire connected at its ends with said arms and leading intermediately through said notch, and a hook in the upright between said pivotal point and notch, as and for the purpose set forth.

3. In a hop trellis, the combination with a pair of uprights, arms pivotally connected at their inner ends with each upright, and a stay for supporting said arms in horizontal position or allowing them to be dropped from such position; of horizontal wires connecting the outer extremities of the corresponding arms of the two uprights, and braces for the uprights opposing the tension of the horizontal wires, as and for the purpose set forth.

4. In a hop trellis, the combination with a pair of uprights, arms pivotally connected at their inner ends with each upright, and a stay for supporting said arms in horizontal position or allowing them to be dropped from such position; of horizontal wires connecting corresponding arms of the two uprights, and an additional wire connecting the uprights below the pivotal point of the arms, as and for the purpose set forth.

5. In a hop trellis, the combination with a pair of uprights, a pair of arms having their inner ends passing to opposite sides of each upright below its upper extremity, a bolt through said inner ends and through the upright, a notch in said upper extremity, a hook in the upright between said notch and bolt, and a stay connected at its ends with said arms and of a length to hold the same horizontal when it is passed through said notch; of horizontal wires connected with corresponding arms of two uprights at points remote from their pivots, as and for the purpose set forth.

In testimony whereof we affix our signatures in presence of two witnesses.

HENRY S. BROUGHTON.
CALVIN BRIGGS.

Witnesses:
WM. A. WHITE, Jr.,
JOHN A. DITTER.